Jan. 4, 1966   I. JACOBS   3,226,961
WASHING MACHINES
Filed Sept. 18, 1963
2 Sheets-Sheet 1
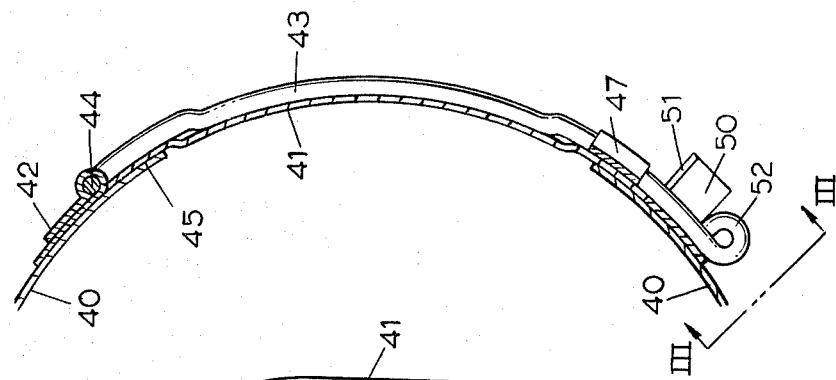
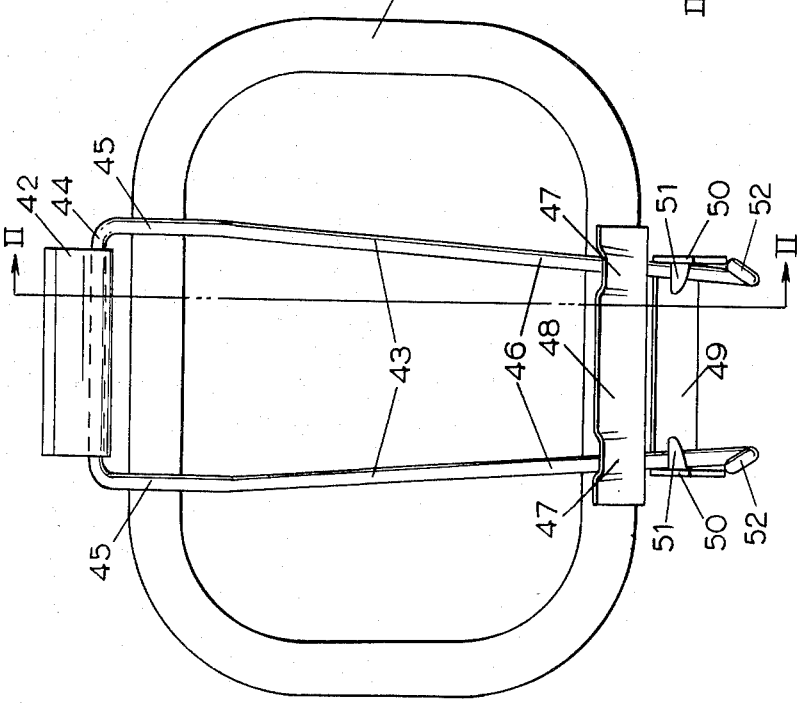
INVENTOR
IRVING JACOBS
BY
Woodhams, Blanchard and Flynn
ATTORNEYS Jan. 4, 1966
I. JACOBS
3,226,961
WASHING MACHINES
Filed Sept. 18, 1963
2 Sheets-Sheet 2
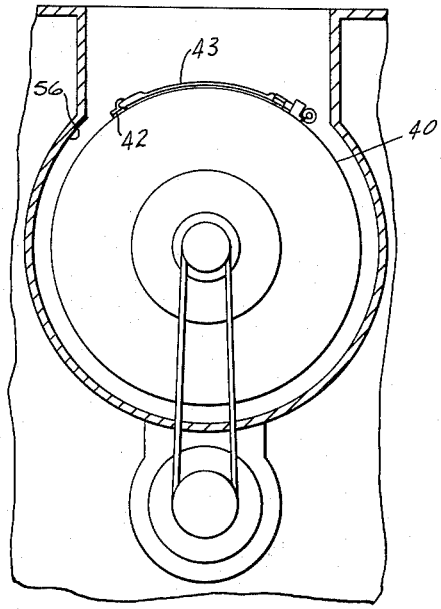
Fig. 4
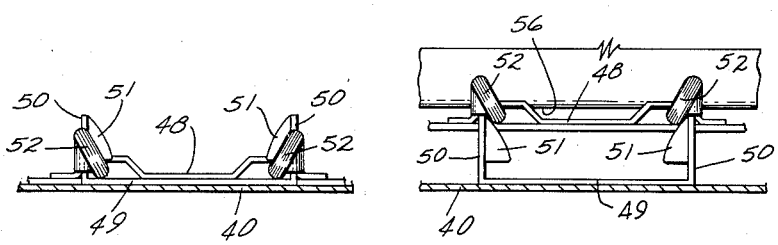
Fig. 3a
Fig. 3b
INVENTOR.
IRVING JACOBS
BY
Wardhams, Blanchard & Flynn
ATTORNEYS

United States Patent Office 3,226,961
Patented Jan. 4, 1966

3,226,961
WASHING MACHINES
Irving Jacobs, Hendon, London, England, assignor to The Washing Machine Research and Development Company Limited
Filed Sept. 18, 1963, Ser. No. 309,783
Claims priority, application Great Britain, May 13, 1963, 18,940/63
2 Claims. (Cl. 68—139)

The invention relates to washing machines of the kind in which an inner perforated drum is mounted horizontally for rotation in an outer non-rotatable water tight drum, and particularly to closure means for such inner drums.

In such machines an inner drum is provided within an outer casing. The inner drum is horizontally disposed and is provided with a lid. On rotation of the drum to bring the lid into the uppermost position in alignment with an opening in the outer stationary casing, the lid can be opened and closed for the washing to be passed into the inner drum.

There is a danger in such a machine that the lid might not be closed before the motor is switched on and the drum or casing consequently damaged.

The invention has among its objects to avoid this danger and to provide a lid which is automatically self-closing and is tightly closed without any possibility of the lid becoming unlatched during rotation of the drum.

According to the invention the lid for the inner rotatable drum of an automatic washing machine is hingedly mounted on the drum and means provided for opening and closing the lid consisting of a U-shaped member hinged at the base to the drum and secured at positions near the base to the lid, the arms of the U extending across the lid, through control brackets or clips secured to that end of the lid opposite the hinged end and constructed to provide a limited inward and outward spring movement of the arms of the U in the opening and closing of the lid and catch plate means secured on the drum in which the free ends of the arms of the U are engaged under the spring pressure of the arms when the lid is closed.

Thus the lid may be hinged to the inner rotatable drum to follow the configuration of the wall of the drum and be held in position by a rod formed generally into a U-shape, the bottom of the U forming the hinge pin, whereby the lid is hinged to the drum, co-operating with a hinge plate secured to the drum, and the arms of the U and extending across and being secured as by welding or rivieting at a convenient position to the lid close to the hinge plate side of the lid thus securing the lid to the drum in such a manner that the lid is free to open and shut. The free ends of the U are mounted to slide under an arm control bracket clip welded or otherwise secured to the lid on the opposite side to the hinge. The bracket is so designed as to keep the free arms of the U close to the lid, and to provide a stop such that the arms of the U cannot spread further apart than will allow them to slide into the control bracket or clip, and so that when sprung together to release the catch, the arms cannot be pressed together so far as to cause a permanent deformation of the U. The free ends of the arms are adapted by being compressed together to slide over catch plate means welded or otherwise secured to the drum at a position on the drum opposite the hinge plate. The U-shaped rod is held, and hence the lid is held against forces exerted radially due to the spin of the drum by passing under two ears on the catch plate means. The U is also restrained from deformation due to forces exerted tangentially by providing the extreme ends of the U curled into a circular form, the curl being approximately spiral such that the end of the curl is turned back over the outside of the free arms of the U. The end of each curl co-operates with a flange turned up from the catch plate means running close by the side of the free arms of the U at the extreme, in such manner that the curl in the extreme ends of the U bears against the edge of the flange on the catch plate means. This provides a rigid stop preventing the arms of the U from a tendency to pull out of the catch in a direction tangential to the surface of the drum.

Ordinarily the lid may be opened by pressing the ends of the arms towards each other, so that the arms may slide over curved brackets on the catch plate and permit the arms to be raised on the hinge and thus by so doing raising the lid. The ends of the arms are so provided that if by chance the lid is left open when the motor is switched on to rotate the inner drum, the ends of the arms will strike against the outer casing and be caused to move inwardly with the ends of the rods sliding over the catch plates into the locked position.

The invention is diagrammatically illustrated by way of example in the accompanying drawings in which:

FIGURE 1 shows a plan view of the lid and the closing means,

FIGURE 2 is a part sectional elevation on the line 2—2 of FIGURE 1,

FIGURE 3a is a sectional view of the catch taken on the line III—III in FIGURE 2 and showing the lid in its closed position, FIGURE 3b is a view similar to FIGURE 3a, but showing the lid in an open position, and FIGURE 4 is a fragmentary, schematic view of the inner and outer drums.

In the drawings 40 is the inner casing or rotatable drum; 41 is the lid formed to the general curvature of the drum; 42 is a hinge bracket, welded or otherwise secured to the inner casing and with which co-operates the base of a U-shaped rod 44; 43 are the two hinge catch arms of the U-shaped rod 44 which rod is formed from a single length of metal and extending side by side across the lid to which they are welded at 45. The ends 46 of the arms are inclined towards each other although they are not parallel, and pass beneath raised portions 47 formed at appropriate positions in an arm control bracket 48 secured as by welding on the lid 41 at a position on the lid opposite the hinge.

At an opposite position to the bracket 48 on the drum, is mounted catch plate means 49 formed of channel section with lugs 50 extending away from the drum and with inwardly extending ears 51 extending from the lugs 50. The ends 52 of the free arms of the U are curled outwardly so that the curled parts of the rod are engaged against movement with the lugs 50 and ears 51.

To open the lid, the ends of the arms are pressed towards each other to clear the lugs 50 and ears 51 and the lid 41 is raised about the hinge bracket. Thus should the casing be rotated without the lid being closed, the ends 52 of the arms will strike against the inner surface of the outer drum 56, thereby forcing the arms against the ears 51 which are formed to a curve for the purpose whereby the arms are caused to slide inwardly and downwardly into the locked position in which the ends of the arms are held against movement by the lugs 50 and ears 51 thus ensuring automatic sealing of the drum.

The hinge catch arms serve as a reinforcement to cause the lid to retain its configurative conformity with the drum against centrifugal action tending to distort it and break the seal, when the drum is rotating at high speed.

What I claim is:

1. A domestic washing machine, comprising: an outer stationary horizontal drum, an inner horizontal drum concentric with and rotatable within said outer drum, means for rotating said inner drum, means defining openings in said inner and outer drums which are adapted to be brought into aligned relation for charging and discharging said inner drum with clothing, a lid having a curvature corresponding to the curvature of the wall of said inner drum and extending across said opening in said inner drum, a substantially U-shaped member having a connecting web and two arms extending away from said web across said opening in said inner drum, means pivotally connecting said web to the wall of said inner drum on one side of said opening in said inner drum said arms being connected to said lid so that said lid can move toward and away from said opening in said inner drum in response to pivotal movement of said U-shaped member, means supporting the free ends of said arms for limited resilient movement toward and away from each other, catch plate means mounted on said inner drum wall on the opposite side of said opening in said inner drum from said web, said catch plate means having two spaced-apart ears spaced outwardly from said inner drum wall and projecting toward each other, said ears having outer faces which are inclined toward said inner drum wall, the free ends of said arms being movable toward each other to locations between said ears and then being resiliently movable away from each other so that said arms can be received between said ears and said inner drum wall to secure said lid against movement with respect to said inner drum, outwardly projecting parts on the free ends of said arms and extending toward said outer drum so that in the event said inner drum is rotated without said arms being engaged with said catch plate means, said parts will engage said outer drum whereby the free ends of said arms will be forced along said inclined faces automatically to latch the lid shut.

2. A domestic washing machine, comprising: an outer stationary horizontal drum, an inner horizontal drum concentric with and rotatable within said outer drum, means for rotating said inner drum, means defining openings in said inner drum and said outer drum which are adapted to be brought into aligned relation for charging and discharging said inner drum with clothing, a lid for closing off said opening in said inner drum, a substantially U-shaped member having a connecting web and two arms extending away from said web across said opening in said inner drum, means pivotally connecting said web to the wall of said inner drum on one side of said inner drum opening, means connecting said arms to said lid so that said lid can be pivoted toward and away from said inner drum opening in response to pivotal movement of said U-shaped member, the free ends of the arms of said U-shaped member being capable of limited resilient movement toward and away from each other, a catch plate including means for engaging the free ends of the arms to hold the lid shut, said catch plate having inclined faces for engaging the free ends of the arms in order to move same toward each other when said arms are moved toward said inner drum, outwardly projecting members on the free ends of said arms and extending toward said outer drum and dimensioned so as to be engageable with said outer drum in the event that said inner drum is rotated without the free ends of the arms being first engaged with said catch plate so that the free ends of the arms are forced along the inclined faces in order automatically to latch the lid shut.

References Cited by the Examiner
UNITED STATES PATENTS

| | | | |
|---|---|---|---|
| 732,913 | 7/1903 | Andresen | 68—142 |
| 1,363,892 | 12/1920 | McDonald | 68—139 |

IRVING BUNEVICH, *Primary Examiner.*

WALTER A. SCHEEL, *Examiner.*